(12) United States Patent
Slick et al.

(10) Patent No.: US 7,552,476 B2
(45) Date of Patent: Jun. 23, 2009

(54) SECURITY AGAINST REPLAY ATTACKS OF MESSAGES

(75) Inventors: Royce E. Slick, Mission Viejo, CA (US); Neil Y. Iwamoto, Mission Viejo, CA (US); Martin Martinez, Hungtington Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 10/875,240

(22) Filed: Jun. 25, 2004

(65) Prior Publication Data
US 2005/0289344 A1 Dec. 29, 2005

(51) Int. Cl.
*G06F 12/14* (2006.01)
*G06F 12/16* (2006.01)

(52) U.S. Cl. .......................................... 726/22; 726/25
(58) Field of Classification Search ........................ None
See application file for complete search history.

(56) References Cited

U.S. PATENT DOCUMENTS

| | | | |
|---|---|---|---|
| 4,578,530 A | 3/1986 | Zeidler | 178/22.09 |
| 5,907,621 A | 5/1999 | Bachman et al. | 380/25 |
| 6,041,357 A | 3/2000 | Kunzelman et al. | 709/228 |
| 6,148,404 A | 11/2000 | Yatsukawa | 713/200 |
| 6,253,325 B1 | 6/2001 | Steele et al. | 713/201 |
| 6,360,254 B1 | 3/2002 | Linden et al. | 709/219 |
| 6,466,780 B1 * | 10/2002 | Geiselman et al. | 455/411 |
| 6,911,974 B2 * | 6/2005 | Asano et al. | 345/204 |

FOREIGN PATENT DOCUMENTS

WO   WO 03034428 A2 * 4/2003

OTHER PUBLICATIONS

Bruce Schneier, Applied Cryptography, 1996, John Wiley & Sons, Inc., Second Edition, p. 186.*
B. Tung, The Moron's Guide to Kerberos, Version 1.2.2 (That's Version 1.2.2 of the Guide, not Kerveros), site visited, Oct. 30, 2003. <URL:http://www.isi.edu/gost/brian/security/kerberos.html>.

* cited by examiner

*Primary Examiner*—Benjamin E Lanier
(74) *Attorney, Agent, or Firm*—Fitzpatrick, Cella, Harper & Scinto (57) ABSTRACT

Security against replay of a message by generating a list of unique message enabling codes (TATs) in a first device and storing the list in a second device. A message generated in the first device, which includes at least one of the unique message enabling codes from the list, is transmitted to the second device. The unique message enabling code of the received message is compared with the list stored in the second device to determine whether or not to enable processing of the message by the second device. If the unique message enabling code received with the message is included in the stored list, processing of the message is enabled and, the corresponding unique message enabling code is deleted from the stored list. If the unique message enabling code received with the message is not included in the stored list, processing of the message is rejected.

15 Claims, 10 Drawing Sheets

SECURITY AGAINST REPLAY ATTACKS OF MESSAGES

BACKGROUND OF THE INVENTION

1. Field of the Invention

The present invention concerns security against replay attacks of messages transmitted over a network. More particularly, the present invention concerns security against replaying an intercepted message by comparing a unique message enabling code included with the message with a listing of unique message enabling codes stored in a receiving device, in order to determine whether or not to enable processing of the message.

2. Description of the Related Art

Replay attacks of messages transmitted over a network have, unfortunately, become a common occurrence. A replay attack typically consists of a hacker intercepting a message transmitted over a network and then, at some later time, re-transmitting the message to the intended device a second time (or replaying the message). As an example, a message may be transmitted over the Internet from a home or business user to a financial institution for the transfer of money from one account to another. A hacker who intercepts the message may, at some later time, send the message to the financial institution a second time, thereby resulting in a second transfer of funds. As another example, the transmission of a confidential print job over a network to a printer may be intercepted by a hacker, who then may replay (i.e., re-transmit) the print job to the printer at a later time, thereby obtaining the confidential information.

While many transmissions over the network, like the foregoing, may utilize some type of security, such as a digital signature, to verify that the message is genuine, such a signature does little to prevent a replay attack. In this regard, by intercepting the message, the hacker can obtain the necessary signature to replay the message at a later time. Since the signature was validated in the first play of the message, it is also likely to be validated in the second play (playback) of the message.

One technique (known as Kerberos) that has been proposed to address replay attacks involves adding a ticket and a time stamp to a transmitted message. When a message is received by a receiving device, the ticket and time stamp are temporarily retained in the receiving device for a specified time (e.g., 5 minutes). When additional messages are received, the ticket and time stamp of the newly-received messages are extracted to determine whether they are the same as any temporarily retained ticket and time stamp. If so, then an error message is returned. Thus, while this system provides some security against replay attacks, it does however suffer from some problems.

One problem with the foregoing system is an increase in overhead due to each receiving device having to provide sufficient storage space to store used tickets and time stamps. As more and more messages are received, a greater amount of storage space is needed to maintain the used tickets. Moreover, as the number of tickets grows larger and larger, more processing time is required to search for the used tickets, thereby degrading the performance of the system with time.

Additionally, a hacker may be able to delete a temporarily retained ticket and time stamp from the receiving device and then replay the message. Thus, although a ticket and time stamp may have been used once, since the ticket and time stamp are removed from the temporarily retained information, the replayed message will be perceived as being valid; presuming that the message is replayed within an allowable timeframe of the time stamp. As a result, the Kerberos process of temporarily retaining used tickets and time stamps, while providing some protection, still has some weakness in the prevention of replay attacks.

SUMMARY OF THE INVENTION

The present invention addresses the foregoing by storing a list of valid codes or tokens in a device that receives and processes jobs, comparing a unique message enabling code (token) included with a received message to the stored list to determine whether or not the code (token) is valid, and then deleting the received code (token) from the stored list. Thus, according to the invention, a list of unique message enabling codes is stored a receiving device. A message generated in a host device, which includes at least one of the unique message enabling codes from the generated list, is transmitted to the receiving device. The receiving device, upon receiving the message, compares the unique message enabling code included with the received message with the codes contained in the stored list to determine whether or not to reject processing of the message. If the unique message enabling code received with the message is included in the stored list, then the message is considered to be valid and the corresponding unique message enabling code is deleted from the stored list. If, however, the unique message enabling code received with the message is not included in the stored list, processing of the message is rejected.

As a result, if a hacker were to intercept the message and attempt to playback the message a second time by re-transmitting the message to the receiving device at a later time, the receiving device will reject the message since the unique enabling code is no longer contained in the stored list. Moreover, unlike the above-described Kerberos system, if a hacker were to delete the stored list of codes from the receiving device, the replayed message would be rejected since the code is not included in the list. Of course, in this case, the first play of the message would also be rejected, but the sender of the message could simply obtain a new code and transmit a new message with the new code. Additionally, a device can be built into the system to automatically obtain a new list of codes should the hacker delete the currently stored list. Thus, by providing a listing of unique message enabling codes in the receiving device that is specific to the receiving device and deleting used codes from the list, security against the playback of intercepted messages can readily be provided.

Thus, in one aspect, the invention provides security against replay of a message transmitted from a first device to a second device by comparing a unique message enabling code of a message received by the second device from the first device with a list of unique message enabling codes stored in the second device to determine whether the unique message enabling code received with the message is included in the stored list. Based on the comparison, a determination is made whether or not to reject processing of the message by the second device. In a case where it is determined that the unique message enabling code received with the message is included in the stored list, processing of the message is not rejected and the corresponding unique message enabling code is deleted from the stored list. On the other hand, in a case where it is determined that the unique message enabling code received with the message is not included in the stored list, processing of the message is rejected.

The list of unique message enabling codes is preferably generated by either a third device or the first device, with the generated list being transmitted to the second device and stored therein. Alternatively, the unique message enabling codes may be mutually generated by the second and third devices rather than transmitting the list between devices. Thus, the message can be generated in the first device such that the message includes at least one of the unique message enabling codes from the generated list. Of course, the message and the unique message enabling code can then be transmitted from the first device to the second device.

As part of generating the message, the first device may request, from the third device, a unique message enabling code to be included in the message, whereby the third device transmits the unique message enabling code to be included in the message to the first device. With this aspect, a secure server can maintain the list of valid codes for the second device and multiple first devices can request a code for the use with sending messages to the second device.

In another aspect of the invention, the second device may determine whether a predetermined number or less of the unique message enabling codes are contained in the stored list. If it is determined that the list contains the predetermined number or less of the unique message enabling codes, the second device can then obtain additional unique message enabling codes for the list. For example, the second device can notify either the first device or the second device that additional codes are needed once the list is depleted to a predetermined number or less. Thus, additional unique message enabling codes can be transmitted to the second device, whereby the second device can either start a new list in place of the currently stored list, or can simply add the additional codes to the current list to form a cumulative list. Alternatively, the second device may simply generate a new list itself, if an embodiment in which mutual generation of the codes is employed.

While the foregoing describes a case where three devices are utilized in the invention, it can readily be recognized that less or more devices could be used instead. For example, a system that utilizes only the first and second devices could be employed, where the list of codes is generated in the first device itself and list is transferred to the second device. Then, when the first device wants to send a job to the second device, it can simply obtain a code to be included with the job from its own internal list, without having to communicate with a third device to obtain the code.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

The present invention is generally directed to preventing replay attacks of messages. As will be described in more detail below, the invention is implemented in a network computing environment in which various devices, such as personal computers, multi-function devices, and servers, communicate with one another over the network. The detailed description provided below, while being directed toward performing a printing operation in which a print job is transmitted from a host computer to a multi-function device and replay of the print job on the multi-function device is to be prevented, is not limited to such an embodiment. Rather, the invention can be implemented in any of various environments in which the replay of messages by unauthorized users is to be prevented. As such, the claims appended hereto are not to be limited to the printing environment, but are to be interpreted broadly as encompassing any environment in which a replay attack of an electronic communication is to be prevented.

Figure 1:
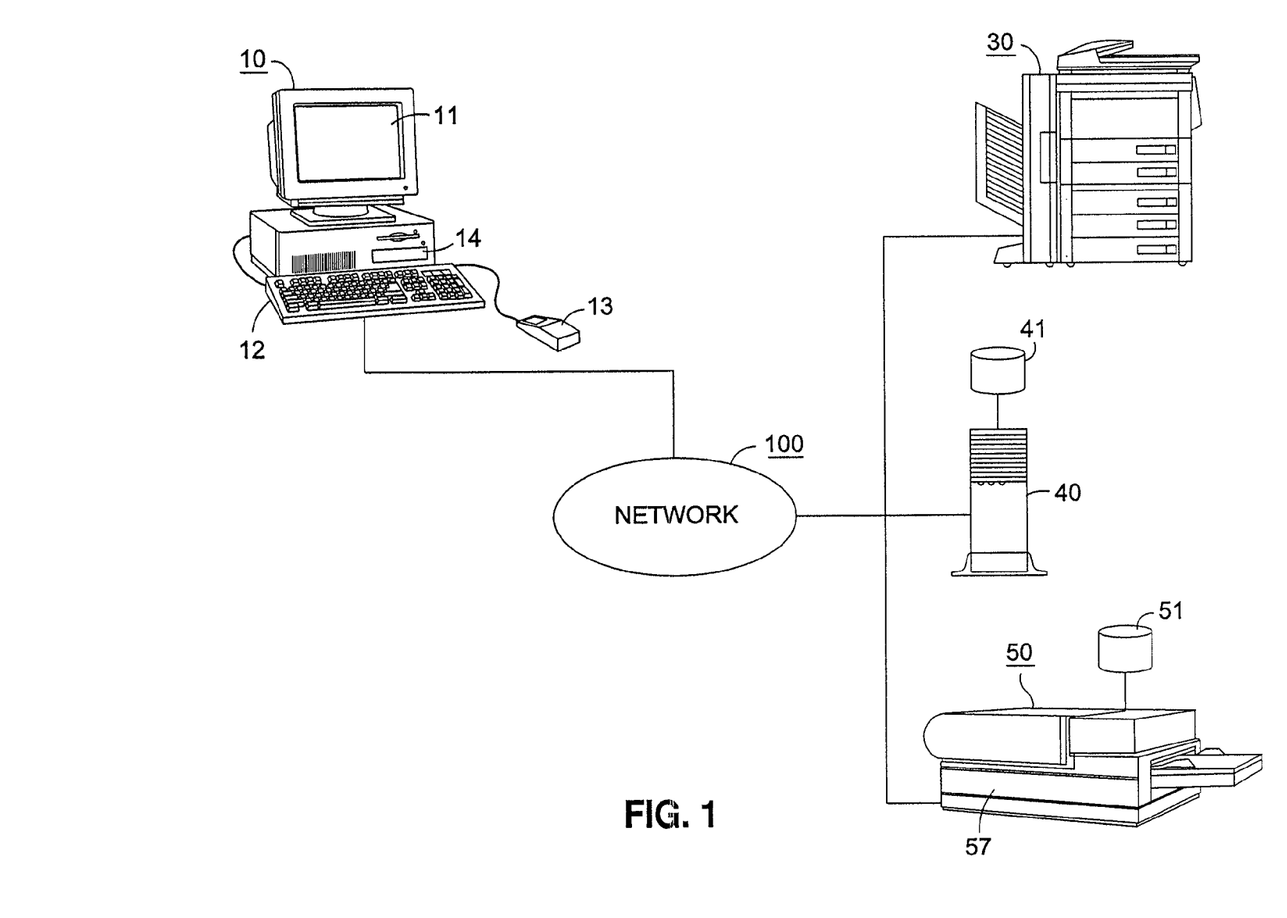
FIG. 1 is a representative view of a networked computing environment in which the present invention may be implemented.

FIG. 1 provides a system view of a networked computing environment in which the present invention may be implemented. As shown in FIG. 1, the networked computing environment may comprise a network 100 to which is connected a desktop computer 10, server 40, multi-function device 30 and printer 50. Network 100 is preferably an Ethernet network medium consisting of a bus-type physical architecture, although the invention can be utilized with other types of networks, including the Internet.

Desktop computer 10 is preferably a personal computer, such as an IBM PC-compatible computer having a windowing environment such as Microsoft Windows 2000®, Windows ME®, etc. operating system. As is typical with personal computers, desktop computer 10 preferably has a display 11 (such as a color monitor), a keyboard 12, mouse 13 or other pointing device, and a storage medium 14, such as a floppy disk, hard disk, CD-ROM, etc.

Also shown connected to network 100 is multi-function device 30, which is capable of receiving commands and data over network 100 to be processed by the device 30. For example, device 30 may receive a print job from personal computer 10 for processing the print job to print an image. Multi-function device 30 may also be capable of receiving and transmitting facsimiles, performing photocopying operations, or scanning images. Multi-function device 30 communicates with other devices over network 100 via a network interface (not shown) so that device 30 can receive and process commands and data from other devices on the network. One feature of the present invention which involves multi-function device 30 is for device 30 to store a listing of unique message enabling codes (also referred to hereinafter as "tokens" or "TATs") that, as will be described in more detail below, are provided to the device 30 by, for example, server 40, and are utilized to prevent the replay of messages or transmissions sent to device 30 by other devices on the network. Thus, device 30 includes the ability to communicate with, not only personal computer 10, but also server 40.

In this regard, server 40 is also connected to network 100. Server 40 preferably comprises a server-type computer having any one of various types of server operating systems, such as DOS, Microsoft Windows 2000 Server, Novell, UNIX, Linux, etc. Server 40 has a storage device 480 which is preferably a large fixed disk for storing numerous files. Server 40 can therefore be utilized by other devices on network 100 as a file server. Server 40 may also act as a gateway for other devices on network 100 to another network such as the Internet. More specific to the present invention, server 40 preferably includes a Security Application (SA) which generates unique message enabling codes, or TATs (Transaction Access Tokens), that are to be utilized in practicing the present invention. That is, the Security Application of server 40 includes the ability to generate a list of TATs that can be transmitted to other devices on the network (such as multi-function device 30) in a secure manner, which may be, for example, an SSL connection or by being encrypted. These processes will be described in more detail below with regard to the server's Security Application.

Printer 50 is also connected to network 100 and is preferably a laser or bubble-jet printer. Printer 50 includes functionality along the lines of multi-function device 30, but is directed more specifically to performing only printing operations. Thus, printer 50 operates, as it relates to the present invention, in the same manner as multi-function device 30 and therefore, the description of device 30 applies equally to printer 50.

Figure 2:
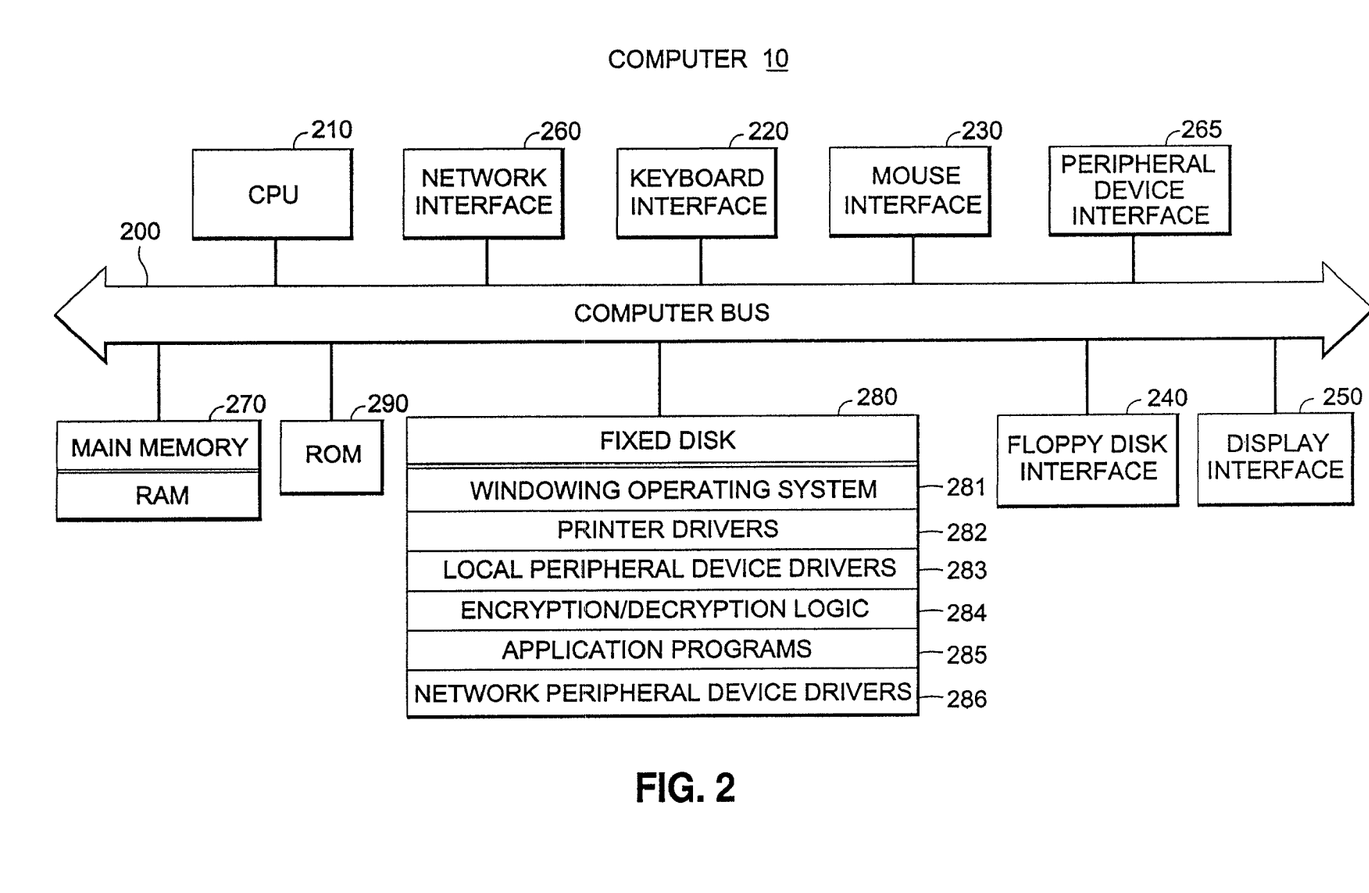
FIG. 2 is a block diagram showing an example of the internal architecture of a personal computer.

FIG. 2 is a block diagram showing an overview of the internal architecture of desktop computer 10. In FIG. 2, desktop computer 10 is seen to include central processing unit (CPU) 210, such as a programmable microprocessor which is interfaced to computer bus 200. Also coupled to computer bus 200 are keyboard interface 220 for interfacing to keyboard 12, mouse interface 230 for interfacing to mouse 13, floppy disk interface 240 for interfacing to floppy disk 14, display interface 250 for interfacing to display (monitor) 11, network interface 260 for interfacing to network 100, and peripheral device interface 265 for interfacing with local peripheral devices (not shown). Random access memory ("RAM") 270 interfaces to computer bus 200 to provide central processing unit ("CPU") 210 with access to memory storage, thereby acting as the main run-time memory for CPU 210. In particular, when executing stored program instruction sequences, CPU 210 loads those instruction sequences from fixed disk 280 (or other memory media) into random access memory ("RAM") 270 and executes those stored program instruction sequences out of RAM 270. It should also be noted that standard-disk swapping techniques available under windowing operating systems allow segments of memory to be swapped to and from RAM 270 and fixed disk 280. Read-only memory ("ROM") 290 stores invariant instruction sequences, such as start-up instruction sequences for CPU 210 or basic input/output operation system ("BIOS") sequences for the operation of peripheral devices attached to computer 10.

Fixed disk 280 is an example of a computer-readable medium that stores program instruction sequences executable by central processing unit ("CPU") 210. Some of the stored program instructions include windowing operating system 281, printer drivers 282, local peripheral device drivers 283, encryption/decryption logic 284, application programs 285, and network peripheral device drivers 286. As mentioned above, operating system 281 is preferably a windowing operating system, although other types of operating systems may be used with the present invention. Printer drivers 282 are utilized to prepare image data for printing on at least one image forming device, such as multi-function device 30 or printer 50. Local peripheral device drivers 283 are utilized to drive and control local peripheral device interface 265 for interfacing with local (i.e., devices connected locally to computer 10) peripheral devices. Encryption/decryption logic 284 provides for performing encryption of data to be transmitted by computer 10 to other devices on the network, as well as to perform decryption of encrypted data received by computer 10 from other devices on the network. Application programs 285 can include, for example, a typical word processor program for creating documents and images, such as Microsoft Word, PowerPoint, or Corel WordPerfect. Network peripheral device drivers 286 contains drivers necessary for computer 10 to communicate with network peripheral devices, such as performing remote operations on multi-function device 30 (e.g., remote scanning, copying, facsimile, etc.).

Figure 3:
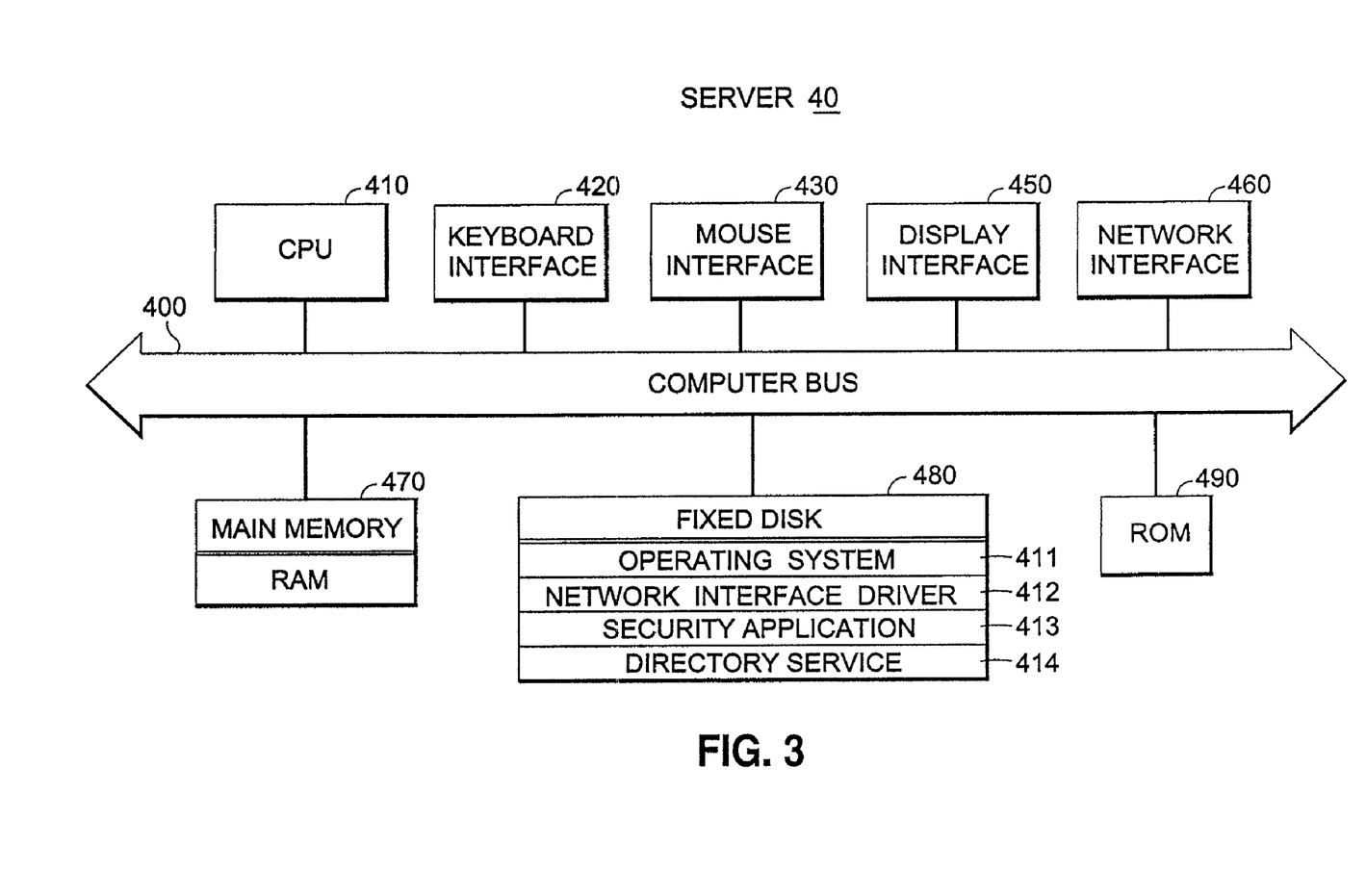
FIG. 3 is a block diagram showing an example of the internal architecture of a server.

FIG. 3 is a block diagram showing an overview of the internal architecture of server 40. In FIG. 3, server 40 is seen to include a central processing unit ("CPU") 410, keyboard interface 420, mouse interface 430, display interface 450, network interface 460 for interfacing to network 100, random access memory ("RAM") 470, fixed disk 480, and read-only ("ROM") 490, all of which are coupled to computer bus 400. The function and operation of each of the foregoing components is similar to the like components described with regard to FIG. 2. Accordingly, the detailed description of the operation of these components described with regard to FIG. 2 applies equally for the components depicted in FIG. 3 and therefore, their description herein is being omitted for brevity.

Fixed disk 480 is an example of a computer-readable medium that stores program instruction sequences executable by CPU 410. In particular, software applications such as operating system 411, network interface driver 412, Security Application 413, and Directory Service 414, may be stored on fixed disk 480. Network interface driver 412 is utilized to drive network interface 460 for interfacing server 40 to network 100. Security Application 413, which will be described in more detail below, provides various security functionality for practicing the invention. Briefly however, Security Application 413 receives commands from various devices on the network, including computer 10, multi-function device 30 and printer 50, and processes the commands accordingly. For example, Security Application 413 may receive commands from multi-function device 30 to publish device information into Directory Service 414, or to request downloading of a block of TATs. Security Application 413 may also receive commands from computer 10 to request authorization to send a job to device 30 (described in more detail below). The authorization request may include a request for any necessary security related information (also described in more detail below) for computer 10 to be able to submit a job to multi-function device 30 in a manner in which replay of the job can be prevented. Directory Service 414 is preferably an LDAP (Lightweight Directory Access Protocol) based directory service which performs various directory functions, such as storing device information of the various devices connected to the network. It should be noted that, while Directory Service 414 is shown as being within fixed disk 480, the Directory Service could be located outside of server 40 instead. For instance, the Directory Service could be implemented in another server (not shown in FIG. 1) such that server 40 communicates with the Directory Service server over the network via network interface 460.

A description will now be made of the software architecture utilized in practicing the invention. Briefly, the architecture includes components of a function user (referred to hereinafter as an "FU"), such as computer 10, a function provider (referred to hereinafter as an "FP"), such as multi-function device 30, a Security Application (referred to hereinafter as an "SA"), such as security application 413, and a Directory Service (referred to hereinafter as a "DS"), such as directory service 414. Each component includes various modules that provide functionality for performing a job submission process according to the invention. For example, in performing a printing operation, a function user, wanting to send a print job to multi-function device 30, transmits a job authorization request command to the Security Application. The request may be for the Security Application to provide the function user with an authorization response, which includes a TAT (Transaction Authorization Token), where the response is to be utilized for transmitting the print job to the device 30. As will be described in more detail below, the TAT included in the authorization response is utilized in preventing a replay attack of the print job. The Security Application processes the authorization request and responds to the function user with the authorization response. The function user, after receiving the authorization response, submits the print job to the device 30 together with the authorization response, where the function provider (device 30) processes the print job accordingly. As will be described in more detail below, processing of the print job by the function provider may include verifying that the TAT included in the authorization response received with the print job is valid so as to prevent a replay attack. These processes will now be described in more detail.

Figure 4:
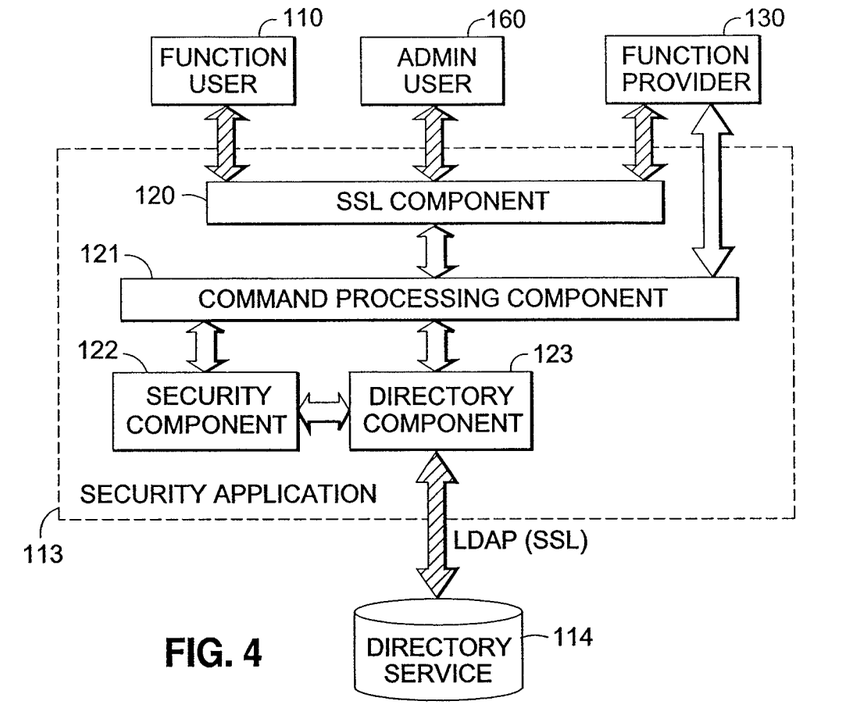
FIG. 4 depicts a software architecture for communication between various components according to the invention.

FIG. 4 gives the overall software architecture of a system with a detailed internal representation of the Security Application component being depicted. As seen in FIG. 4, the Security Application component 113 (SA) communicates with a function user 110 (FU), which may comprise computer 10, a function provider 130 (FP), such as multi-function device 30, an administrative user 160 (shown as an "AU"), and a Directory Service 114 (DS), such as directory service 414. The communication between the SA 113 and the FU 110, AU 160, and DS 114 is preferably on a secure transmission protocol, such as SSL (Secure Sockets Layer). An SSL communication is depicted in FIG. 4 by the hashed arrows, while non-SSL communications are depicted with plain arrows. However, the communication between the SA 113 and the FP 130 can be on both SSL links as well as non-SSL links. An SSL link may be utilized, for example, in a case where a list of tokens (TATs) are downloaded from the SA 113 to the FP 130, while a non-SSL link may be utilized when publishing device information by the FP 130 to the DS 114 when the device is a new device, or when a list of tokens (TATs) is to be downloaded from the SA to the FP utilizing encryption.

As seen in FIG. 4, Security Application 113 includes SSL Component 120, Command Processing Component 121, Security Component 122, and Directory Component 123. The SSL Component 120 in the SA provides SSL support for socket communication. All the data going out on the socket goes through the SSL component. Of course, if a non-SSL connection is utilized for the communication, the SSL Component would comprise a communication component corresponding to the type of connection being utilized rather than SSL.

Command Processing Component 121 handles incoming calls to the SA. The main functionality of the Command Processing Module is to translate the incoming commands from different sources to appropriate components in the SA.

An example of a command that the Command Processing Module may recognize is a Device Publishing Command. The Device Publishing Command is for publishing device information (i.e., MIB (Management Information Base) information, etc.) of a new device into the DS 114. The Command Processing Component communicates with the Directory Component 123 and the Security Component 122 for this command.

The Security Component 122 performs various operations, including generation and delivery of security information to new devices, such as the generation and delivery of TATs to devices on the network, and applying a digital signature to a TAT to be included in an Authorization Response (described in more detail below). TATs are utilized in the present invention to prevent replay attacks by ensuring that a given transaction, whether a print job or any other type of transaction, will only be processed once. The basic application of the TAT in replay prevention is as follows.

A single TAT or a list of TATs is generated by the SA. Preferably, the TAT possesses characteristics (such as a simple random value or a random value combined with a representation of the time and date) that guarantee that it is both unique (never repeated) and that it cannot be reasonably predicted or guessed by an attacker. The TAT is delivered securely to the FP (e.g., via SSL or by being encrypted), preferably together with other TATs as part of a block of TATs, where they are stored in the FP. That is, a block of TATs are generated by the SA and pre-distributed to the FP, or at convenient intervals, such that the FP maintains a block of TATs that will be used for future operations. Thus, the SA can generate a block of TATs in advance and send them to the FP, where they will be securely stored until needed. An FU, wanting to send a job to the FP, transmits an authorization request to the SA. The SA processes the request and generates an authorization response. One of the TATs delivered with the block of TATs to the FP is included in the authorization response by the SA, whereby the response is then returned to the FU that transmitted the authorization request. The FU delivers the job, together with the authorization response which includes the TAT, to the FP. The FP confirms that the TAT included with the job is valid by matching it with the list of TATs that it received earlier from the SA. If the TAT is found to be valid (i.e., it is contained in the stored block), the FP processes the job and then deletes the TAT from the stored list such that any future jobs containing the same TAT will not be honored. This token-based authorization system ensures that each transaction will only be processed once. Thus, if a bit image of the transaction is replayed by an attacker, the FP will fail to find a matching TAT in its local store, and will reject the transaction. An added advantage of this implementation is that there is no need for the FP to store copies of used tokens for future reference. This approach prevents attacks that might be mounted by destroying tokens stored by the FP, as may occur during a power cycle to the device, and then sending a replay of the transaction to the device, where a used token would not be found. On the other hand, it might be necessary to re-distribute active TATs to the device, following a power cycle, depending of the volatility of the token store. Any such distribution can be easily managed within the bounds of the normal distribution mechanism as will be described in more detail below.

A brief description will now be provided with regard to TAT generation and distribution by the SA to the FP, as well as mutually independent generation of the TATs by the SA and the FP.

In a preferred embodiment, all tokens are generated by the SA and are either generated on an as-needed basis and transferred individually to the FP, or are generated as a block of tokens and transferred to the FP in a single operation. Regardless of whether they are generated individually or as a block, the same method can be used for token construction. In this regard, the SA may generate the TAT by simply generating a cryptographically strong random value (rv) of adequate length, or by combining the time-of-day, to the finest resolution available, and the random value. The resulting output of the generator (e.g., rv, tod in combination with rv, etc.) may be used directly as a TAT. Thus, if the TAT simply comprises a random value (rv), the SA generates a cryptographically strong random value utilizing any known generator. In the combination embodiment, each TAT could be individually generated by the SA, using the following method:

$$TAT_n = tod \| rv$$

where: tod is the time-of-day,
rv is a cryptographically strong random value, and
$\|$ represents concatenation.

For the initial token, a simple generator can be implemented as:

$$TAT_0 = tod \| rv$$

where: tod is the time-of-day,
rv is a cryptographically strong random value, and
$\|$ represents concatenation.

With a fine enough resolution in the real-time clock on the SA, uniqueness could be guaranteed.

Once the TATs are generated, they may be securely distributed by the SA to the FP, either individually on an as-needed basis, or more preferably, as a block of TATs. As mentioned above, the TATs can be distributed by the SA to the FP via an SSL connection, or the block can be digitally signed by the SA, with the block then being encrypted and transmitted by the SA to the FP.

As an alternative to the foregoing, the TATs may be mutually independently generated by the SA and the FP. That is, the SA may independently generate a block of TATs and the FP may also independently generate a corresponding block of TATs. This method eliminates the need to transmit the block of TATs over the network from the SA to the FP, thereby reducing the possibility of an attacker intercepting the block. The mutual generation may, for example, employ hashing or encryption during the generation process. Using this embodiment, the SA and the FP independently generate an identical series of TAT values, which cannot be predicted by an attacker, even if the attacker has knowledge of a series of previous values. One way to accomplish this task is to use a simple generator which uses a hash function to mix the inputs. Using this approach, the initial token in the combination embodiment can be generated by the SA as follows:

$$TAT_0 = tod \| rv$$

where: tod is the time-of-day, and
rv is a cryptographically strong random value.

Subsequent, identical tokens can be generated independently by both the SA and the FP, using:

$$TAT_n = tod \| Hk(TAT_{n-1} \| n)$$

where: H is a keyed hash function, such as HMAC-SHA1,
tod is the time-of-day provided by the SA in the initial token,
k is the random key generated by the SA, during initialization of the current block, and
n is the value of a counter, where n>0.

With this embodiment, since all the variables on the right side of the equation may be known to an attacker, the presence of the hash key is required. Without knowledge of k, an attacker is unable to generate $TAT_n$, despite possession of tod, $TAT_{n-1}$, and n.

Thus, as can be seen from the foregoing, the TATs may be generated and distributed between the SA and FP in any of various implementations. Preferably, however, the TATs are generated by the SA as a block, with the block of TATs being distributed to the FP where they are stored for future use. Of course, the block of TATs are also maintained by the SA so that when an FU requests to perform an operation on the FP, the SA can determine which TATs correspond to the FP that the FU wants to use and can provide an appropriate TAT to the FU for the FU to include in a job sent to the FP.

Figure 5:
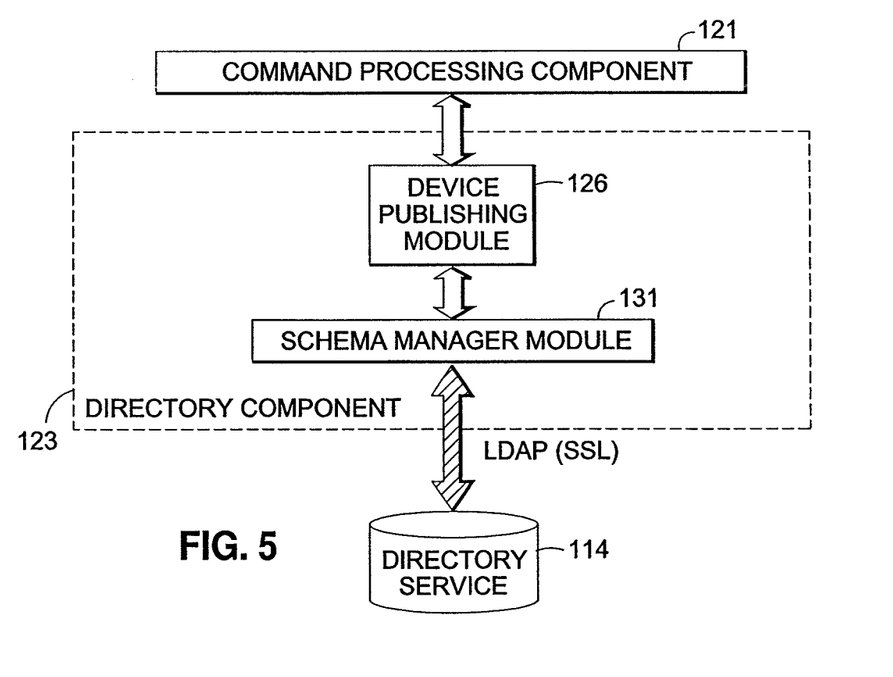
FIG. 5 depicts a software architecture for processing commands by a directory component.

Returning to FIG. 4, Directory Component 123 communicates with Command Processing Component 121 and Directory Service 114. FIG. 5 depicts a more detailed block diagram of Directory Component 123.

As seen in FIG. 5, Directory Component 123 includes Device Publishing Module 126 which communicates with Command Processing Component 121 and Schema Manager Module 131. Device Publishing Module 126 handles device publishing commands received by the SA from the FP to set up any new devices. When a new device is initiated and performs a discovery operation to discover the SA, the Device Publishing Module obtains device configuration information from the FP according to the device schema and stores the collected information in Directory Service 114. Schema Manager Module 131 handles the directory access requests and has knowledge of the directory schema, therefore it is able to map any directory access request to the directory schema to pull the appropriate information that is stored in the Directory Service, preferably via LDAP.

Figure 6:
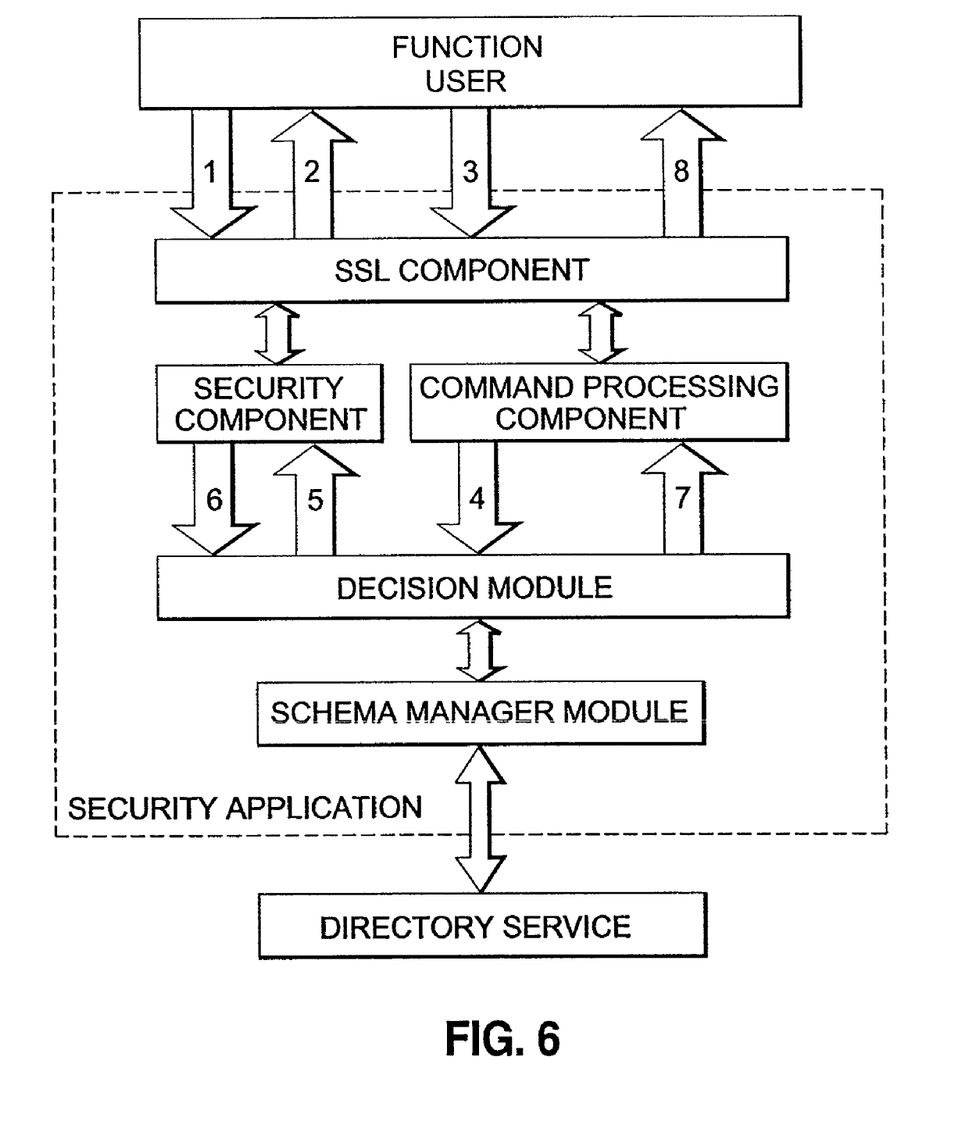
FIG. 6 depicts a software architecture for communication involving an authorization request and an authorization response according to the invention.

FIG. 6 depicts an example of communication between the FU, SA and DS according to the invention. In the following description, the numbered arrows shown in FIG. 6 depict the communication between the various modules and the numbered arrows will be referred to by a parenthetical (e.g., (arrow 1) for arrow number 1). In FIG. 6, assuming that the link between the FU and the SA is via SSL, the FU 110 connects to the SSL-Port on which the SA is listening (arrow 1). An authentication process between the FU and SA may be performed at this time so that the SA accepts the connection and spawns a thread and a new data communication socket for the FU. Thus, a secured (SSL) connection is established between the SA and FU (arrow 2). The FU then sends an authorization request to the SA (arrow 3). The authorization request may be, for example, a request by the FU to perform a printing operation on the FP 130 and for the SA to provide the FU with a TAT. The Command Processing Component 121 processes the request, invokes a Decision Module 127, and passes the request to the Decision Module 127 (arrow 4). The Decision Module processes the request to build authorization bits and passes the authorization bits to the Security Component (arrow 5). The Security Component processes the authorization bits to provide an encrypted (preferably digitally signed) TAT back to the Decision Module (arrow 6). The Decision Module 127 sends the encrypted TAT back to the FU (arrows 7 and 8) in the form of an authorization response. The socket connection between the FU and the SA is then closed.

Figure 7:
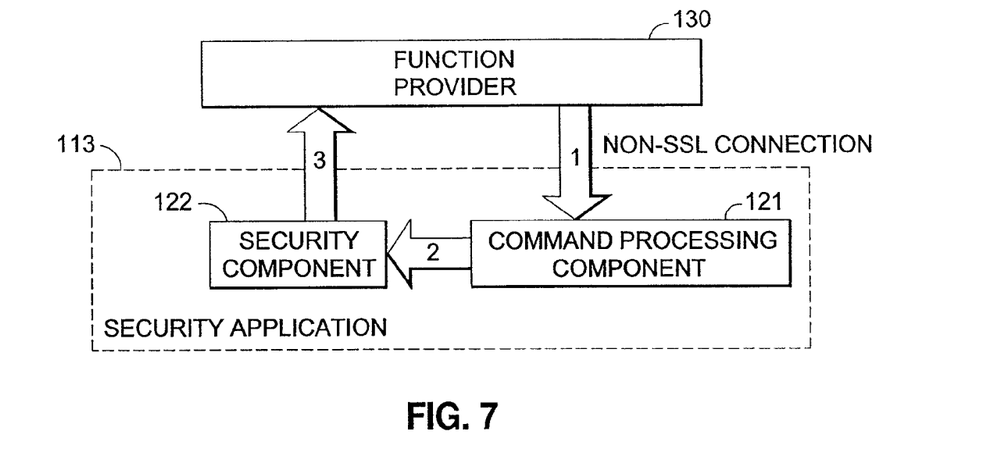
FIG. 7 depicts an example of communication between a function provider and a security application.

FIG. 7 depicts an example of a software architecture for communication between the FP 130 and the SA 113. As seen in FIG. 7, the FP may initiate a non-secure communication with the SA. The non-secure communication may be used, for example, for commencing the initial setup of a new device on the network, or requesting that the SA provide the FP with a new block of TATs. Thus, the FP connects to a non-SSL port on which the SA is listening. The SA accepts the connection and spawns a thread and a new data communication socket for this FP. In the initial setup mode, the FP sends a Device Publishing Command to the SA, which specifies that it is a new device, along with a Command Information Block (arrow 1). If the FP is requesting a new block of TATs, arrow 1 represents a command requesting the new block. The Command Processing Component 121 processes the received command and passes it to the Security Component 122 (arrow 2). If the FP is a new device, the Security Component 122 generates security information to be downloaded to the new device. More specifically, the Security Component of the SA generates a public/private key pair for the new device, and a signed certificate for the SA. The Security Component also generates a block of TATs utilizing any one of the methods described above. This process is performed in both a case where the command is for setting up a new device, or where the command is for obtaining a new block of TATs. Alternatively, for setting up a new device, in an embodiment where mutual generation of TATs is employed, the Security Component may generate an initial TAT that is to be used by both devices for generation of future TATs. The security information, or the new block of TATs, is then downloaded to the FP (arrow 3). It should be noted that the communication of arrow 3, unlike arrow 1, is a secure communication. That is, the security information or the new block of TATs is downloaded either: 1) by the SA establishing an SSL link with the FP and then transmitting the security information to the FP via SSL, or 2) by the SA encrypting the security information and then transmitting the encrypted security information to the FP. The FP then breaks the connection and the socket is closed.

Figure 8:
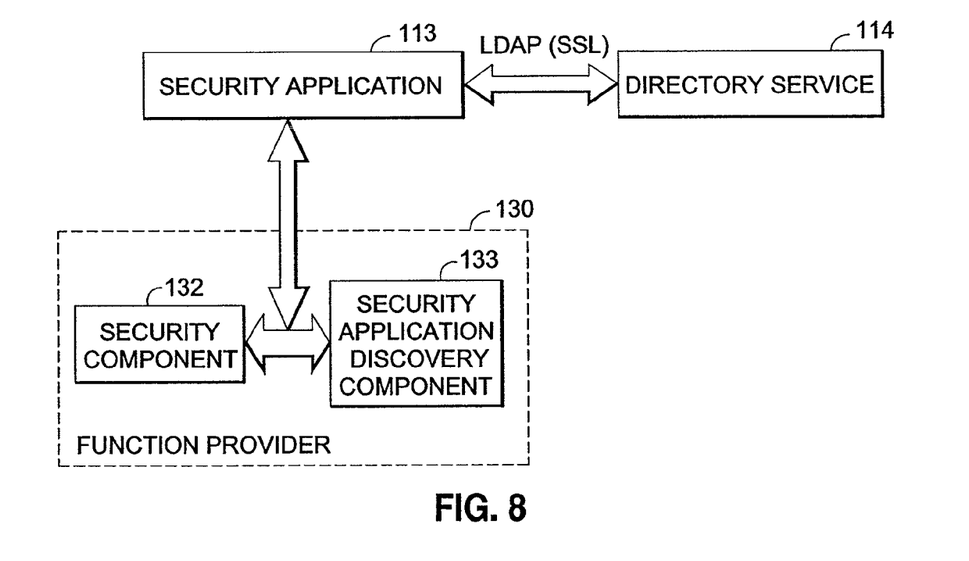
FIG. 8 depicts a software architecture within a function provider.

FIG. 8 depicts an internal software architecture for the FP. As seen in FIG. 8, the FP preferably communicates with the SA through the secure channel connection provided by the Security Component 132. A Security Application Discovery Component 133 handles the SA discovery process. When the device is powered up, this module uses DNS services to discover the enterprise SA component and establishes the secure connection between the SA and the FP.

Figure 9:
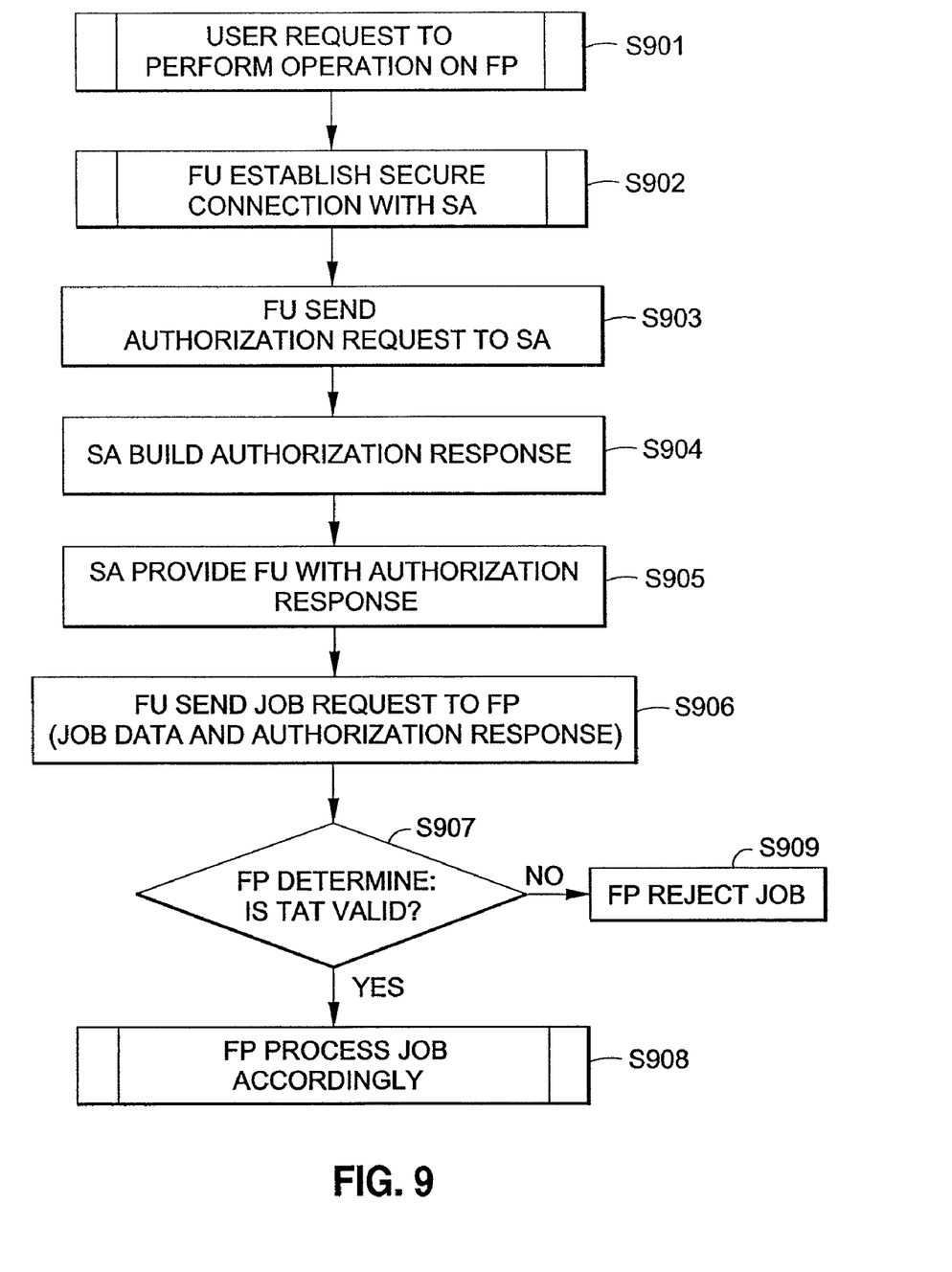
FIG. 9 is a flowchart of process steps for sending a job to a function provider and the function provider processing the job according to the invention.

FIG. 9 is a flowchart of process steps for submitting a job from a function user (FU) to a function provider (FP). As an example of the submission of job, a print job may be submitted from computer 10 (constituting an FU) to multi-function device 30 (constituting an FP), where the print job is processed through server 40 (constituting an SA). However, a print job is not the only type of job that may be submitted and the job may comprise any of various functions, such as a request to perform a remote copying operation, a facsimile operation, a scanning operation, to transfer funds from one account to another, etc. Moreover, while the FP is preferably a multi-function device that can perform any one or more of the foregoing operations, it need not be a multi-function device, but can be any other type of device instead, such as a server, a printer, a copier, a facsimile device, etc. Referring now to FIG. 9, in step S901, a user performs some type of action to initiate an authorization request to perform an operation on the FP. In a case where a print job is to be submitted from computer 10 to multi-function device 30, the user performs the initiating action at the computer 10. However, the user may initiate the request action at any FU device and the invention is not limited to a computer that is separate from the FP. For example, the FP itself may include an operating unit, such as a touch panel display on a multi-function device that communicates with the network, such that the user can initiate the request at the FP itself. In the case where the FU is the personal computer 10, the request action may be initiated by a user performing an operation in an application program to submit a job to the FP. As is commonly known for performing printing operations, the user may initiate the printing process by selecting a print option within an application program, such as a word processing program, whereby a print driver is activated for submitting the print job for printout.

In the present invention, when the print driver is activated, job data is generated by the print driver for the print job. For instance, the print driver may generate job data that includes the type of operation to be performed (i.e., printing), the number of pages of the job, as well as various printing options (color printing, duplex printing, etc.). In addition, information of the FU (computer 10) and the FP (multi-function device 30) may be included in the job data. For instance, identification information such as MAC addresses or IP addresses of the FU and FP may be obtained and included in the job data. Once the job data has been obtained, it is packaged for transmission to the SA, preferably in the form of an authorization request message.

The FU then establishes a connection with the SA to transmit the authorization request to the SA (step S902). The connection is preferably a secure connection, such as SSL. This can be seen to correspond to arrows 1 and 2 of FIG. 6. However, the authorization request may also be transmitted to the SA in encrypted form instead of being transmitted via SSL. Once the secure connection has been established, the FU sends the authorization request command to the SA (step S903). This can be seen to correspond to arrow 3 of FIG. 6. The SA, upon receiving the authorization request, processes the request to build an authorization response (step S904). In building the authorization response, the SA obtains a TAT for the FP identified in the authorization request, and digitally signs the TAT. The encrypted (digitally signed) TAT is then included within the authorization response and the SA provides the FU with the authorization response (step S905). The SA preferably provides the FU with the authorization response in a secure manner (i.e., SSL or via encryption).

After the FU receives the authorization response from the SA, the FU builds an FP command package in the form of a job request, which includes job data and the authorization response. That is, the authorization response received by the FU from the SA is merely inserted into the job request in the same form that it is received. The job request (which includes the job data and the authorization response) is preferably encrypted utilizing a session key, with the encrypted job then being sent by the FU to the FP (step S906). Upon receiving the encrypted job request, the FP decrypts the received data utilizing the session key and extracts the TAT from the authorization response. The FP determines whether the extracted TAT is valid (step S907), and if so, processes the job data accordingly (step S908) (i.e., the job is printed out if it is a print job). If the TAT is determined to be invalid, the job is rejected (step S909). The TAT validation process of step S907 is described in more detail below with regard to FIGS. 10 and 11.

Figure 10:
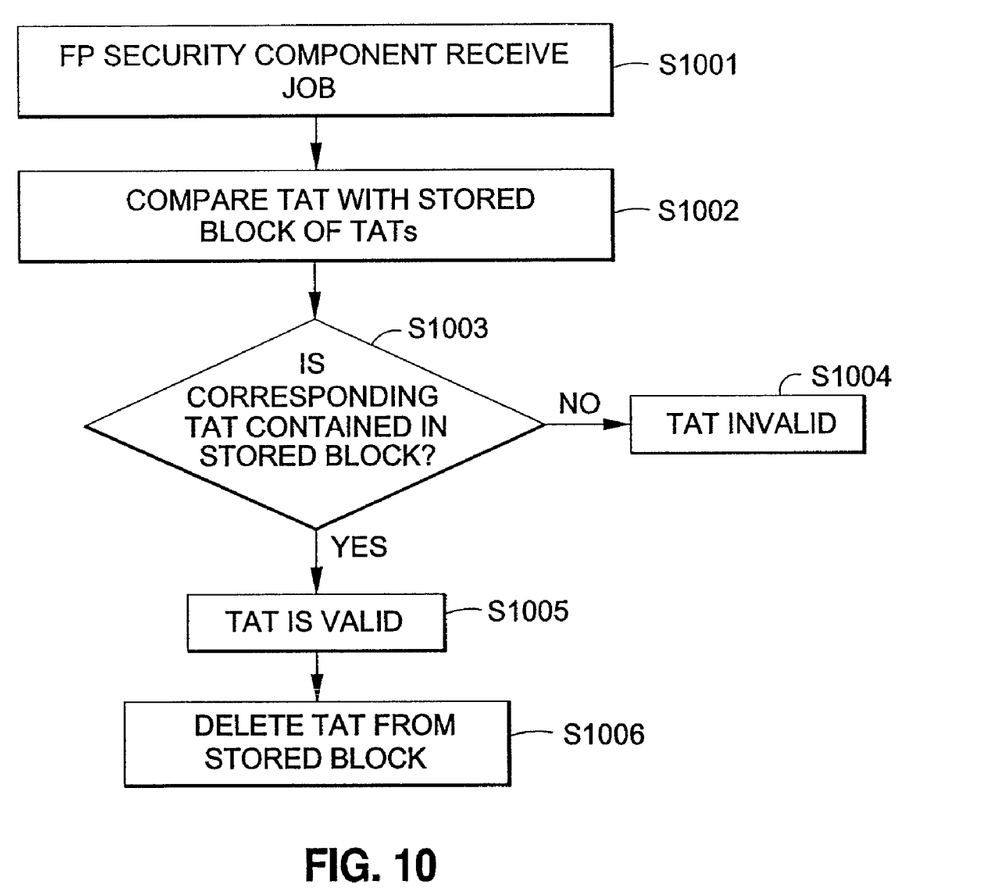
FIG. 10 is a flowchart of process steps of a function provider determining the validity of a token received with a job.

FIG. 10 is a flowchart of process steps of the FP determining the validity of a TAT received with a job. As seen in FIG. 10, the Security Component 132 of the FP receives the job from the FU (step S1001). As stated above, the job preferably includes the TAT as part of the authorization response. The Security Component 132 extracts the TAT from the received authorization response and compares it with the block of TATs previously stored in the FP (step S1002). As described above, the block of TATs are preferably stored in the FP in advance. Based on the comparison, a determination is made whether or not the TAT received with the job is included in the stored block of TATs (step S1003). If not, then the TAT is determined to be invalid (step S1004) and the job is rejected (step S909). If a corresponding TAT is included in the stored block, then the TAT is determined to be valid (step S1005) and the job is processed accordingly. Once a TAT has been used, the TAT is deleted from the stored block of TATs (step S1006). The flow then proceeds to step S908 of FIG. 9.

Figure 11:
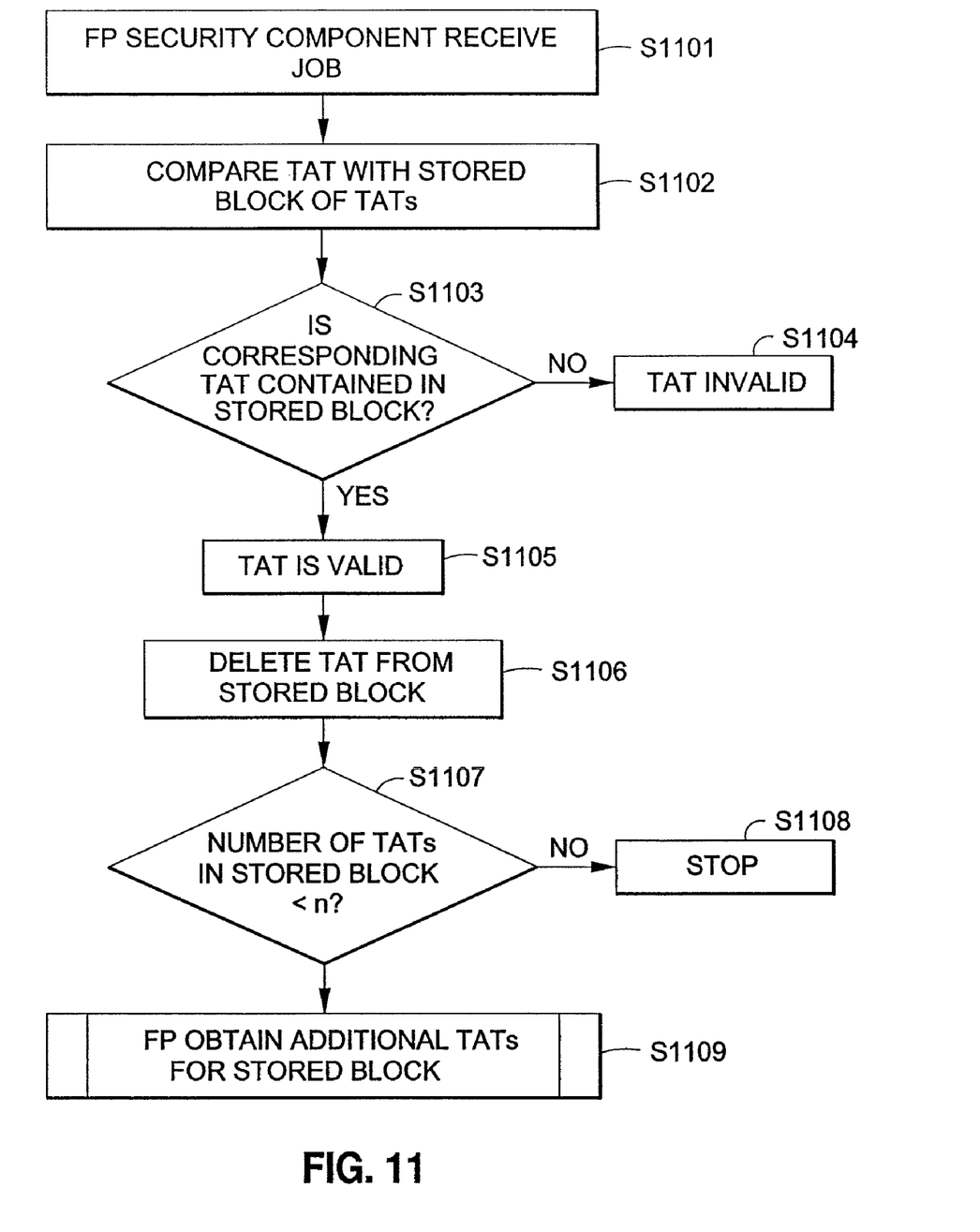
FIG. 11 is a flowchart of process steps of a function provider determining the validity of a token received with a job and determining if additional tokens are needed.

FIG. 11 is a flowchart similar to FIG. 10, but includes additional steps that may be included within the TAT validation process. Thus, steps S1101 to S1106 are the same as steps S1001 to S1006 described above. However, in FIG. 11, once the TAT is deleted from the stored block of TATs, a determination is made whether or not a sufficient number of TATs remain in the stored block. Thus, in step S1107 a determination is made whether the number of TATs remaining in the stored block is less than a predetermined number (n), where n may be any whole number. For instance, n may be equal to one (1) such that if no (zero) TATs remain in the stored block, the FP may perform a process to obtain additional TATs. Thus, if a sufficient number of TATs are still remaining in the stored block, the TAT validation process stops (step S1108) and flow proceeds to step S908 to process the job. However, if an insufficient number of TATs remain in the stored block, then the FP performs a process to obtain additional TATs for the stored block (step S1109). It should be noted that an additional determination may be made as part of step S1107 prior to commencing the process to obtain additional TATs, whereby a determination may be made as to whether or not the process of downloading or obtaining additional TATs is already in progress. If the process is already in progress, then step S1109 would not need to be performed and flow would proceed to step S1108. In a case where the block of TATs are generated by the SA and transmitted by the SA to the FP, a process such as will be described below with regard to FIG. 12 may be employed. However, in an embodiment in which the TATs are mutually generated by the SA and the FP, the Security Component 132 of the FP may simply generate a new block of TATs internally based on the mutual TAT generation algorithm and store the additional TATs in the block.

Figure 12:
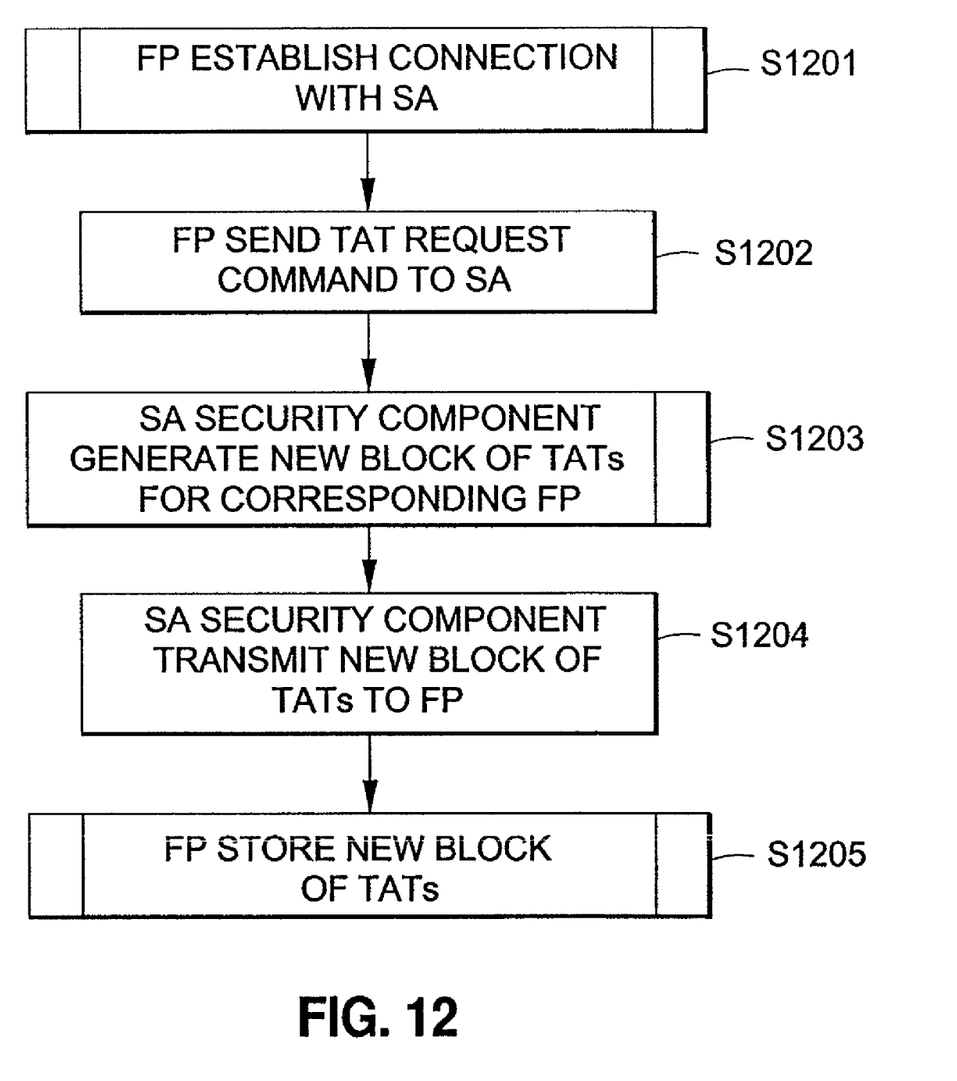
FIG. 12 is a flowchart of process steps for a function provider to obtain additional tokens from a security application.

FIG. 12 is a flowchart of process steps for a function provider to obtain additional TATs from the SA in the case where the block of TATs are generated by the SA and transmitted to the FP, rather than mutual generation of TATs. The process steps of FIG. 12 correspond to the process of step S1109. As seen in FIG. 12, when the FP determines that additional TATs are needed for the stored block, the FP establishes a connection with the SA (step S1201). The connection is preferably a secure SSL connection, but if SSL is not utilized and an encryption based communication of TATs is to be utilized instead, then the connection could be a non-secure connection. After establishing a connection with the SA, the FP sends a command to the SA requesting additional TATs (step S1202). The SA, upon receiving the request, may first perform various authentication checks to authenticate the FP that transmitted the request. When the FP has been authenticated, the SA processes the request and generates a new block of TATs (step S1203). The new block of TATs are generated in the same manner as that described above with regard to TAT generation. The new block of TATs are then securely transmitted to the FP (step S1204). As described above, the block of TATs can be securely transmitted by the SA to the FP via SSL, or the block of TATs can be encrypted and, optionally, digitally signed and then transmitted over a non-SSL channel to the FP. Once the FP receives the new block of TATs, the new block is stored in the FP (step S1205). In step S1205, the new block of TATs may be stored in the Security Component 132 by deleting any remaining TATs from the currently stored block and replacing them with the newly received block of TATs, or alternatively, the newly received block of TATs may be added to any remaining stored TATs so as to form a cumulative block.

Thus, as can be seen from the foregoing description of FIGS. 9 to 12, an FU sends an authorization request to an SA. The SA processes the request and generates an authorization response, which includes a TAT, and transmits the authorization response to the FU. The FU, upon receiving the authorization response, sends a job to the FP, where the job includes the authorization response. The FP, upon receiving the job and authorization response, extracts the TAT and compares the received TAT with a stored listing of TATs to determine whether or not the TAT is valid. If the received TAT is not included in the stored list, then the job is rejected. That is, the FP determines that the present job request is a replay of a previously submitted job due to the inclusion of a TAT that has already been received and deleted from the list. If, however, the received TAT is found to be included in the stored list, then the TAT is considered to be valid and the job is processed accordingly. The TAT is then deleted from the stored list so that any attempt to replay the job request using the same TAT will be rejected. As can readily be seen, the foregoing process provides a relatively automated way for preventing replay attacks of messages.

The foregoing process steps may be implemented as computer-executable process steps that are executed by one or more computer devices. The computer-executable process steps may be stored on a computer-readable medium, such as a floppy disk, magnetic disk, CD-ROM, hard disk, etc. Thus, the invention may be implemented as the computer-executable process steps themselves, or the computer-readable storage medium that stores the computer-executable process steps. Moreover, an apparatus, such as a computer, which has the computer-executable process steps stored therein may comprise the invention.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method implemented in a computer system for providing security against the replay of a message transmitted from a first device to a second device over a network, comprising the steps of:

the second device generating a first list of unique message enabling codes and storing the generated first list in a storage unit of the second device;

a third device generating a second list of unique message enabling codes and storing generated second list in a storage unit of the third device;

the first device requesting, from the third device, a unique message enabling code to be included in a message;

the third device obtaining, in response to the request, a unique message enabling code from the second list stored in the storage unit of the third device and transmitting the obtained unique message enabling code to the first device;

the first device generating a message to be transmitted to the second device, and transmitting the generated message to the second device together with the unique message enabling code transmitted from the third device;

the second device receiving, via the network, the message, together with the unique message enabling code transmitted by the first device;

the second device comparing the unique message enabling code received with the message from the first device with the first list of unique message enabling codes stored in the storage unit of the second device to determine whether the unique message enabling code received with the message is included in the stored first list; and the second device determining, based on the comparing step, whether or not to reject processing of the message by the second device, wherein, in a case where the comparing step determines that the unique message enabling code received with the message is included in the stored first list, processing of the message is not rejected, the message is processed, and the corresponding unique message enabling code is deleted from the stored first list, wherein, in a case where the comparing step determines that the unique message enabling code received with the message is not included in the stored first list, processing of the message is rejected, and wherein, in generating the first list and second list of unique message enabling codes by the second device and the third device, respectively, each of the second device and the third device independently generates its respective list of unique message enabling codes by using a common default value and a common hash key.

2. The method according to claim 1, further comprising the steps of:

determining, in the second device, whether a predetermined number or less of the unique message enabling codes are contained in the stored first list, and in a case where it is determined that the first list contains the predetermined number or less of the unique message enabling codes, the second device generating additional unique message enabling codes for the first list.

3. The method according to claim 2, wherein the additional unique message enabling codes comprise a new list that is stored in the second device in place of the currently stored list.

4. The method according to claim 2, wherein the additional unique message enabling codes are added to the currently stored list.

5. A computer-readable storage medium on which is stored a computer-executable program to be executed by a computer system for providing security against the replay of a message transmitted over a network from a first device to a second device, the program comprising the steps of:

the second device generating a first list of unique message enabling codes and storing the generated first list in a storage unit of the second device;

a third device generating a second list of unique message enabling codes and storing the generated second list in a storage unit of the third device;

the first device requesting, from the third device, a unique message enabling code to be included in a message;

the third device obtaining, in response to the request, a unique message enabling code from the second list stored in the storage unit of the third device, and transmitting the obtained unique message enabling code to the first device;

the first device generating a message to be transmitted to the second device, and transmitting the generated message to the second device together with the unique message enabling code transmitted from the third device;

the second device receiving, via the network, the message, together with the unique message enabling code transmitted by the first device;

the second device comparing the unique message enabling code received with the message from the first device with the first list of unique message enabling codes stored in the storage unit of the second device to determine whether the unique message enabling code received with the message is included in the stored first list; and the second device determining, based on the comparing step, whether or not to reject processing of the message by the second device, wherein, in a case where the comparing step determines that the unique message enabling code received with the message is included in the stored first list, processing of the message is not rejected, the message is processed, and the corresponding unique message enabling code is deleted from the stored first list, wherein, in a case where the comparing step determines that the unique message enabling code received with the message is not included in the stored first list, processing of the message is rejected, and wherein, in generating the first list and second list of unique message enabling codes by the second device and the third device, respectively, each of the second device and the third device independently generates its respective list of unique message enabling codes by using a common default value and a common hash key.

6. A computer-readable medium according to claim 5, further comprising the steps of:

determining, in the second device, whether a predetermined number or less of the unique message enabling codes are contained in the stored first list, and in a case where it is determined that the first list contains the predetermined number or less of the unique message enabling codes, the second device generating additional unique message enabling codes for the first list.

7. A computer-readable medium according to claim 6, wherein the additional unique message enabling codes comprise a new list that is stored in the second device in place of the currently stored list.

8. A computer-readable medium according to claim 6, wherein the additional unique message enabling codes are added to the currently stored list.

9. An apparatus that receives via a network and processes messages from a host device, comprising:

a network interface for receiving and transmitting messages to/from the host device via the network;

a generating device that generates a first list of unique message enabling codes to be utilized in processing messages received from the host device;

a storage unit that stores the first list of unique message enabling codes generated by the generating device;

a processor that executes computer-executable process steps; and a memory medium that stores information, including computer-executable process steps to be executed by the processor, wherein the computer-executable process steps comprise: (a) receiving, via the network from the host device, a message generated by the host device, together with a unique message enabling code transmitted by the host device with the message, (b) comparing the unique message enabling code received with the message from the host device with the first list of unique message enabling codes stored in the storage unit to determine whether the unique message enabling code received with the message is included in the stored first list; and (b) determining, based on the comparing step, whether or not to reject processing of the message by the apparatus, wherein, in a case where the comparing step determines that the unique message enabling code received with the message is included in the stored first list, processing of the message is not rejected, the message is processed, and the corresponding unique message enabling code is deleted from the stored first list, wherein, in a case where the comparing step determines that the unique message enabling code received with the message is not included in the stored first list, processing of the message is rejected, wherein the unique message enabling code received with the message from the host device is obtained by the host device from a third device by a process of i) the third device generating a second list of unique message enabling codes and storing the generated second list in a storage unit of the third device, ii) the host device requesting, from the third device, a unique message enabling code to be included with the message, iii) the third device obtaining, in response to the request, a unique message enabling code from the second list stored in the storage unit of the third device and transmitting the obtained unique message enabling code to the host device, and wherein in generating the first list and the second list of unique message enabling codes by the apparatus and the third device, respectively, each of the apparatus and the third device independently generate its respective list of unique message enabling codes by using a common default value and a common hash key.

10. The apparatus according to claim 9, wherein the process steps further comprise the apparatus determining whether a predetermined number or less of the unique message enabling codes are contained in the stored first list, and in a case where it is determined that the first list contains the predetermined number or less of the unique message enabling codes, the generating device generating additional unique message enabling codes for the first list.

11. The apparatus according to claim 10, wherein the additional unique message enabling codes comprise a new list that is stored in the apparatus in place of the currently stored list.

12. The apparatus according to claim 10, wherein the additional unique message enabling codes are added to the currently stored list.

13. The method according to claim 1, wherein the message and the unique message enabling code transmitted by the first device to the second device are subjected to a digital signature algorithm prior to being transmitted.

14. A computer-readable medium according to claim 5, wherein the message and the unique message enabling code transmitted by the first device to the second device are subjected to a digital signature algorithm prior to being transmitted.

15. The apparatus according to claim 9, wherein the message and the unique message enabling code transmitted by the host device to the apparatus are subjected to a digital signature algorithm prior to being transmitted.

* * * * *